United States Patent [19]
Ustuner et al.

[11] Patent Number: 5,902,242
[45] Date of Patent: May 11, 1999

[54] SYSTEM AND METHOD FOR FORMING A COMBINED ULTRASONIC IMAGE

[75] Inventors: Kutay F. Ustuner, Mountain View; Charles E. Bradley, Burlingame, both of Calif.

[73] Assignee: Acuson Corporation, Mountain View, Calif.

[21] Appl. No.: 09/010,712

[22] Filed: Jan. 22, 1998

[51] Int. Cl.[6] .................................................... A61B 8/00
[52] U.S. Cl. .......................................... 600/443; 600/447
[58] Field of Search ..................... 600/437, 443, 600/459, 447; 310/336, 340, 339

[56] References Cited

U.S. PATENT DOCUMENTS

| | | | |
|---|---|---|---|
| 4,161,121 | 7/1979 | Zitelli et al. | 600/447 |
| 4,541,435 | 9/1985 | Saito et al. | 600/443 |
| 4,850,363 | 7/1989 | Yanagawa | 600/445 |
| 5,215,094 | 6/1993 | Franklin et al. . | |
| 5,301,168 | 4/1994 | Miller | 367/138 |
| 5,396,143 | 3/1995 | Seyed-Bolorforosh et al. | 600/459 |
| 5,415,175 | 5/1995 | Hanafy et al. . | |
| 5,438,998 | 8/1995 | Hanafy . | |
| 5,456,255 | 10/1995 | Abe et al. . | |
| 5,462,057 | 10/1995 | Hunt et al. | 600/447 |
| 5,468,201 | 11/1995 | Adams | 600/447 |
| 5,479,926 | 1/1996 | Ustuner et al. . | |
| 5,523,058 | 6/1996 | Umemura et al. | 600/439 |
| 5,577,505 | 11/1996 | Brock-Fisher et al. . | |
| 5,628,322 | 5/1997 | Mine | 600/458 |
| 5,651,365 | 7/1997 | Hanafy et al. | 600/459 |
| 5,657,295 | 8/1997 | Howard | 367/140 |
| 5,678,554 | 10/1997 | Hossack et al. | 600/459 |

FOREIGN PATENT DOCUMENTS

| | | |
|---|---|---|
| 770 352 | 5/1997 | European Pat. Off. . |
| 0 851 241 | 7/1998 | European Pat. Off. . |
| 8 294 487 | 11/1996 | Japan . |

*Primary Examiner*—Francis J. Jaworski
*Attorney, Agent, or Firm*—Brinks Hofer Gillson & Lione

[57] ABSTRACT

An ultrasonic imaging system includes an ultrasonic transducer array having a thinner portion, an intermediate portion, and a thicker portion that extend along an azimuthal direction. This transducer array is used to acquire first and second images of an imaged region. The first and second images differ in ultrasonic imaging bandwidth and/or ultrasonic center frequency such that the intermediate transducer portion is active in both the images while at least one of the thinner and the thicker transducer portions is active in only one of the images. The first and second images are then combined to form a composite display image.

45 Claims, 5 Drawing Sheets

SYSTEM AND METHOD FOR FORMING A COMBINED ULTRASONIC IMAGE

BACKGROUND OF THE INVENTION

This invention relates to an ultrasonic imaging system and method for forming a combined image from at least two ultrasonic images that differ in resolution.

Ustuner, et al. U.S. Pat. No. 5,479,926 describes an ultrasonic imaging system that combines a detail image having high spatial resolution with a contrast image having high contrast resolution to produce a combined image. This combined image combines both detail resolution of the detail image and contrast resolution of the contrast image. With this approach, improved combined images can be created.

The present invention represents an improvement to the imaging systems described in the above-identified Ustuner patent, and this improvement provides yet further operational advantages.

SUMMARY OF THE INVENTION

The present invention is defined by the following claims, and nothing in this section should be taken as a limitation on those claims.

Without intending any limitation, it can be said by way of introduction that the first ultrasonic imaging method and system described below combine first and second ultrasonic images obtained from an ultrasonic transducer array that differs in thickness along the elevational direction. The first ultrasonic image is obtained with a relatively high ultrasonic imaging bandwidth that causes thin, intermediate, and thick regions of the transducer to be active. This results in an image frame having a relatively high axial resolution and a relatively low elevational resolution. The second ultrasonic image is formed using an ultrasonic imaging bandwidth that is substantially narrower than that of the first ultrasonic image. This narrower ultrasonic imaging bandwidth causes the portion of the transducer that is of intermediate thickness to be active, while the thicker and thinner portions remain inactive. This causes the second frame to have a lower axial resolution and a higher elevational resolution at ranges spaced from the geometric focus. The first and second frames are combined in a two-dimensional lookup table to produce a composite frame for display. This composite frame displays both the higher axial resolution characteristic of the first frame and the higher elevational resolution characteristic of the second frame. As described below, the transducer array can be either symmetrical (e.g. plano-concave) or asymmetrical (e.g. ramped). Furthermore, other imaging parameters (such as transmit center frequency, for example) can differ between the first and second frames.

DETAILED DESCRIPTION OF THE PRESENTLY PREFERRED EMBODIMENTS

The following paragraphs will first discuss general principles related to the present invention, and will then turn to a detailed description of specific embodiments.

General Principles

Resonance phenomena determine which portions of an ultrasonic transducer array are active on transmit and/or receive. In general, a transducer array is characterized by a stack thickness function $T(y)$ of the elevation position y, where $T(y)$ is equal to the combined thickness of the ceramic and the matching layers (the transducer stack) at position y.

Figure 7:
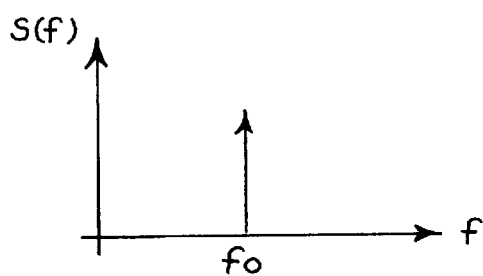
FIGS. 7–13 are graphs that provide examples of frequency and thickness spectra, a thickness profile, an aperture function, and relations therebetween.
Figure 8:
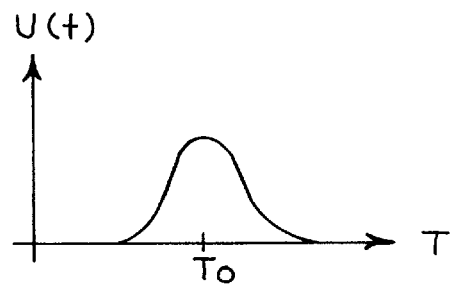

It is simplest to consider the single-frequency case first. Under single frequency excitation (see FIG. 7), a stack of uniform thickness will respond in a way that depends upon how close the frequency of excitation is to the frequency of resonance of the transducer stack. Even if the stack thickness is not such that the stack is resonant at that frequency, there is some degree of excitation. In other words, a particular frequency is capable of causing a response in transducer stacks that lie, for the most part, within a particular range of thicknesses. The closer that thickness is to being resonant at the excitation frequency, the larger the response. Each excitation frequency is therefore associated with a respective thickness spectrum $U(t)$ (see FIG. 8), a measure of how much excitation results, as a function of stack thickness, from a particular frequency of excitation. If the transducer stack is of uniform thickness, then we look at the thickness spectrum at the single point that corresponds to the thickness of the transducer stack to determine what the magnitude of the response to that particular frequency of excitation will be.

Figure 9:
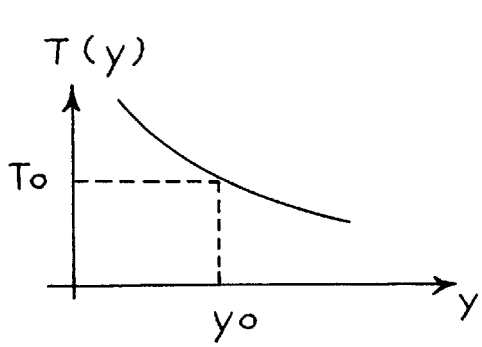
Figure 10:
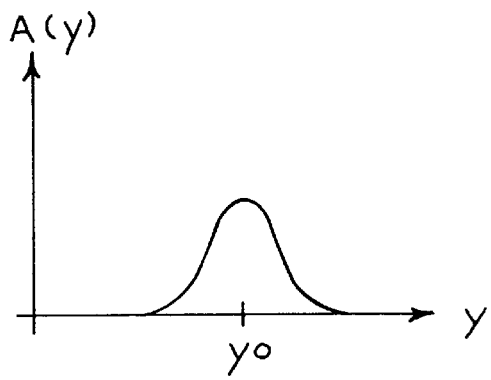
Figure 11:
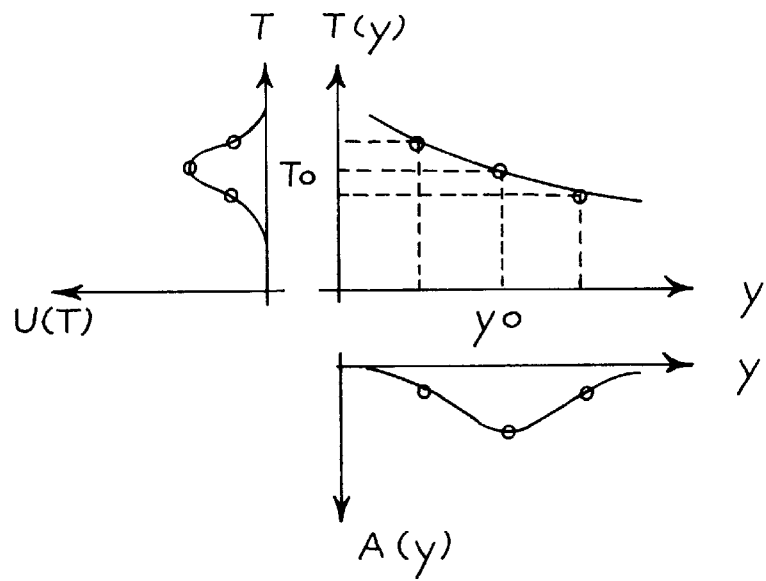

If the transducer stack is not uniform in thickness, then each part of the stack has a generally different thickness and will respond differently to the excitation. The thickness profile $T(y)$ is simply the stack thickness as a function of distance y along the elevational aperture (see FIG. 9). The parts of the transducer stack that have a thickness that lies near the peak of the thickness spectrum $U(t)$ associated with the excitation will have a large response. Parts of the stack that have a thickness that lies towards the edge of the thickness spectrum $U(t)$ will have a fairly small response. In this way $T(y)$, the thickness profile associated with a particular transducer stack, acts as a map (see FIG. 11) that maps the thickness spectrum $U(t)$ (response as a function of thickness) to an aperture function $A(y)$ (response as a function of position along the transducer stack—see FIG. 10).

This approach may be extended from single frequency to spectral excitation. Whereas a single frequency is associated with some range of thickness (i.e., a thickness spectrum), a spectrum of frequencies is associated with a generally broader thickness spectrum. Again, the thickness profile $T(y)$ maps this thickness spectrum $U(t)$ to an aperture function $A(y)$.

The concept of a thickness spectrum is a somewhat inverted way of thinking about the excitation of a transducer. A transducer stack is usually considered as having a single thickness and an associated response spectrum, i.e., the spectrum of excitation frequencies that elicit a response in a transducer stack of that thickness. The thickness spectrum U(t) addresses the same issue from another vantage point: a single excitation frequency and the spectrum of thicknesses that respond to that frequency. The tools necessary for the calculation of these two functions, the frequency response spectrum and the thickness response spectrum, are identical. In both cases we must be able to calculate the response of a transducer stack of a particular thickness to an excitation of a certain frequency. For highly simplified systems, analytic tools suffice. In more realistic situations, numerical methods will often be required.

Figure 12:
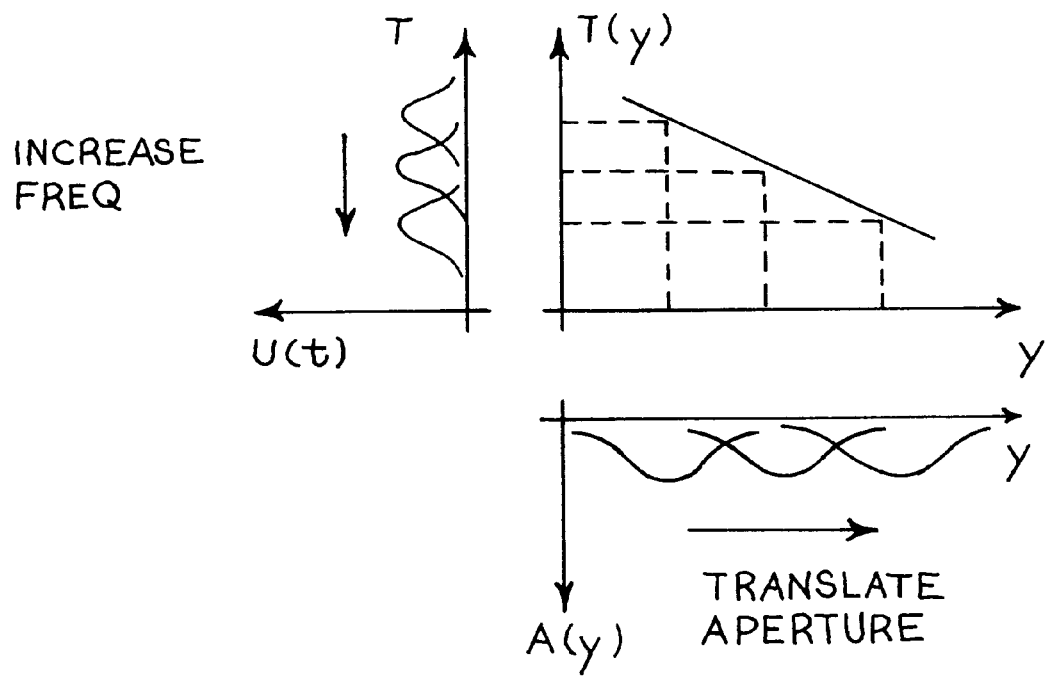
Figure 13:
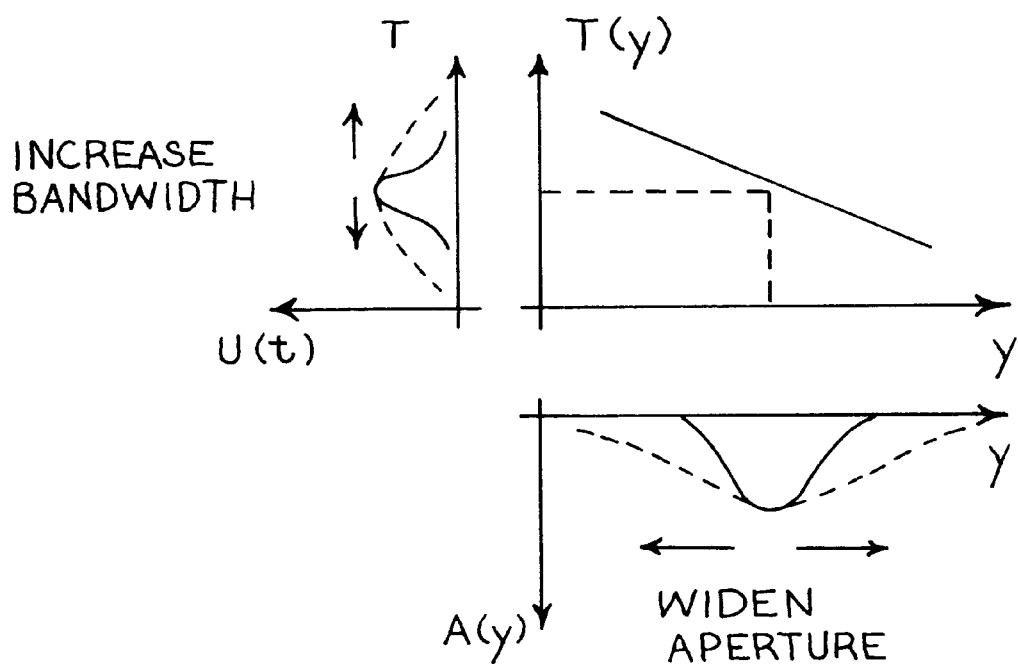

Several general observations may be made. Consider first a linearly tapered wedge transducer stack having a thickness profile T(y) as shown in FIG. 12. FIG. 12 represents a linear mapping from the thickness spectrum U(t) to the aperture function A(y) via the thickness profile T(y). The peak of the aperture function A(y) occurs at the value of y that is associated with the peak of the thickness spectrum U(t) through T(y). Because the peak of the thickness spectrum U(t) is associated with the spectral peak of the excitation pulse, and the spectral peak of the excitation pulse occurs at the carrier frequency of the excitation pulse, the carrier frequency alone determines the location of the center-of-mass of the aperture function A(y). This is true regardless of the breadth of the thickness spectrum U(t), and therefore regardless of the pulse bandwidth. If the center frequency of the excitation pulse is changed, but the relative bandwidth of the pulse remains unchanged, then the aperture simply translates along the transducer stack with no associated change in aperture width (see FIG. 12). If the relative bandwidth of the excitation pulse is changed without change of the carrier frequency, then the aperture remains centered on the same location but changes in width (see FIG. 13). This is a simple example of the control of the aperture function A(y) via excitation frequency and bandwidth.

Consider what happens if the slope of the wedge of a tapered transducer stack is changed. The thickness spectrum U(t) does not change; only T(y), the mapping from thickness to position, changes. If the slope of the wedge is increased, then the thickness spectrum U(t) will get mapped onto a more narrow range of positions y. That is, the aperture narrows. Consider what happens if the wedge is not a uniform wedge as discussed above, but is a wedge with a slope that is variable but does not change sign. That is, the wedge thickness increase is non-uniform but monotonic. If we change the carrier frequency of the pulse but not the relative bandwidth, then the aperture translates, as it does with a uniform wedge. As the slope of the wedge changes, however, the thickness spectrum is mapped onto a range of positions that changes in width. That is, changes in center frequency shift the location of the aperture, but the local slope of the stack in turn affects the aperture width. In other words, the orthogonality of the control of aperture position and width by pulse frequency and bandwidth, respectively, that characterized the linearly tapered wedge, is lost. The carrier frequency alone still determines the aperture position, but the relative bandwidth and stack slope both contribute to the determination of the aperture width. Increases in the relative bandwidth of the pulse and decreases in the slope of the thickness profile both lead to increases in aperture width.

With more complicated thickness profiles, more complicated behavior occurs. If the thickness profile has a minimum, for example, then thickness spectra U(t) with peaks that occur at a smaller value of thickness than the minimum thickness of the stack get mapped such that the aperture peak occurs at the minimum thickness. In this regime of operation, changes in center frequency do not lead to changes in aperture position as they do in the case of a wedge. Instead, changes in frequency, like changes in bandwidth, lead only to changes in aperture width. If the peak of the thickness profile U(t) occurs at larger values of thickness, then the aperture function becomes double-peaked, and the frequency again determines the location of the peaks and the bandwidth determines the width. For this reason, symmetrically cupped stacks have smoothly tapered, narrow apodizations at relatively high frequency, where the thickness spectrum U(t) peaks at a value of thickness that is smaller than the stack minimum, and it may be desirable to operate such devices at frequencies near the upper band edge. As the carrier frequency is lowered, the thickness spectrum slides up and is mapped to successively broader apodizations, until finally the apodization begins to become double-peaked, a so-called 'inverse apodization' that is usually avoided in practice.

This invention can be used with any transducer array having an active elevation aperture size that is a function of the center frequency and/or the bandwidth of the transmit pulse on transmit and/or the receive signal on receive. Such transducer arrays allow the elevation aperture size to be controlled by controlling selected ones of the transmit pulse center frequency and bandwidth, and the receive band-pass filter center frequency and bandwidth.

The stack thickness profile T(y) discussed above can be a symmetric function which is thin at the center and thick at the edges, as in the transducer array 18 described below. Alternately, the function T(y) can be an asymmetric non-decreasing (or non-increasing) function of the elevation position, as in the transducer array of FIG. 6 described below. Such a transducer array can be thin at one edge and thick at the other edge along the elevational axis Y, as described for example in Hossack, et al. U.S. patent application Ser. No. 08/675,412, filed Jul. 2, 1996 and assigned to the assignee of this invention.

With a thickness function T(y) that is symmetric about the center of the transducer array, high frequency components of the transmit pulse or the received echoes activate the center of the array, and low frequency components activate the edges of the array. The aperture size and apodization are determined by the composite response of all of the ultrasonic frequency components in the round trip pass-band. High frequency, narrow bandwidth operations result in a small active elevation aperture with tapered apodization profiles, and low frequency operations or wide bandwidth operations result in a wider aperture that may, in the extreme, become inverse apodized. As described below, contrast frames can be generated by using only a high-frequency, narrow-band transmit pulse and/or receive filtering. Detail frames can be formed using any operating frequency having a bandwidth that is wide enough for the desired axial resolution.

When the thickness function T(y) is asymmetric, the elevation aperture position can be controlled by properly choosing the center frequency. The bandwidth of the transmit pulse and/or the receive filtering can be used to control the active elevation aperture size and the apodization shape. Using transducers having asymmetric thickness functions T(y), contrast frames are generated using a narrow bandwidth transmit pulse and/or receive filtering. The operating frequency in this case is not limited to the highest operating frequency. Preferably, when transducer arrays having asymmetric thickness functions are used, the contrast and detail frames share a common operating frequency and are therefore coplanar. Ultrasonic imaging bandwidth is varied to be greater for the detail frame and smaller for the contrast frame.

Specific Examples

Turning now to FIGS. 1–6, FIG. 1 shows a block diagram of an ultrasonic imaging system 10 suitable for use with this invention. The system 10 includes a transmit beamformer 12 and a receive beamformer 14 that are coupled via a multiplexer 16 to a linear transducer array 18.

The transmit beamformer operates in the conventional manner to supply phased transmit pulses to the individual elements of the transducer array 18. The transducer array produces ultrasonic pulses in response to the transmit pulses. These ultrasonic pulses propagate as transmit scan lines through an imaged region 20. This imaged region 20 in a medical application will typically include a tissue of interest in a human patient.

Ultrasonic echoes from the imaged region are converted by the transducer array 18 into electrical receive signals that are applied via the multiplexer to the receive beamformer 14. The receive beamformer coherently adds these receive signals to create beamformed signals representative of echo amplitudes from selected points in the imaged region. These beamformed signals are applied to an image processor 22 that processes the beamformed signals for display on a display 24. The various elements of the system 10 including the transmit beamformer 12, the receive beamformer 14 and the image processor 22 are controlled in real time by a controller 26.

The features of the imaging system 10 described above are conventional and well known to those skilled in the art. For this reason, no further description is required here. A suitable commercially available ultrasonic imaging system 10 is the Sequoia 512 system supplied by Acuson Corporation of Mountain View, Calif.

In alternative embodiments, the transducer array may be either symmetrical or asymmetrical. A symmetrical embodiment is described below in connection with FIG. 2, and an asymmetrical embodiment is described below in connection with FIG. 6.

Figure 2:
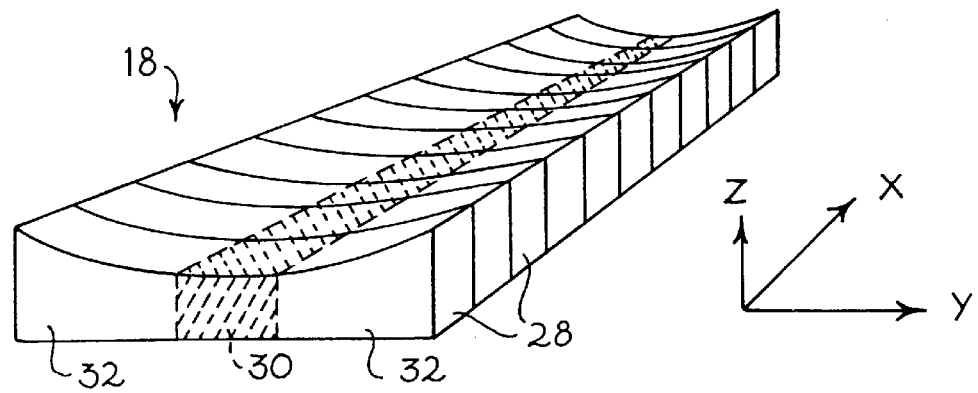
FIG. 2 is a partially schematic perspective view of the transducer array of FIG. 1.

As shown in FIG. 2, the transducer array 18 includes a linear array of plano-concave transducer elements 28 that are arranged side-by-side along an azimuthal direction X. Each of the transducer elements 28 receives a separate respective transmit pulse from the transmit beamformer 12 and supplies a separate respective receive signal to the receive beamformer 14.

The individual transducer elements 28 are identical in cross sectional shape, and this cross sectional shape is concave to provide a thickness T that varies along the elevational direction Y. Thus, the thickness T of each transducer element 28 is greater near the edges of the transducer element 28 and smaller near the center of the transducer element 28. In FIG. 2 thickness is measured along the Z direction. Transducers of the general type shown in FIG. 2 are described in Hanafy U.S. Pat. Nos. 5,415,175 and 5,438,998, assigned to the assignee of this invention.

By way of example, the following explanation will make reference to a thinner region 30 and a thicker region 32. In this embodiment the thinner region 30 is centered in the transducer array 18, and it extends along the azimuthal direction X. The thicker region 32 includes two portions, each extending to a respective edge of the transducer array 18. The thicker region 32 also extends along the azimuthal direction X.

In one mode of operation, the controller 26 controls the transmit beamformer 12 to apply transmit pulses having two different ultrasonic frequency spectra to acquire two separate frames of image data. The transmit pulses for the first frame of image data are characterized by a broad ultrasonic imaging bandwidth as shown in the transmit pulse spectrum 34 of FIG. 4. This broad imaging bandwidth transmit pulse causes substantially the entire width of each transducer element 28 along the elevational direction to be excited. Higher frequencies in the broad-band transmit pulse excite the transducer elements 28 in the thinner regions 30, and lower frequencies in the broad-band transmit pulse excite the transducer elements in the thicker regions 32. Such broad-band transmit pulses provide excellent axial resolution in the resulting image, at the cost of a relatively low resolution in the elevational or Y axis at ranges spaced from the focus. In other words, the elevational thickness of the slice of tissue in the imaged region 20 is relatively large at ranges spaced from the focus because the entire width of the transducer array 18 along the elevational or Y direction is active. Because this first frame of ultrasonic image data is characterized by high axial resolution, it will on occasion be referred to as the detail frame below.

Figure 3:
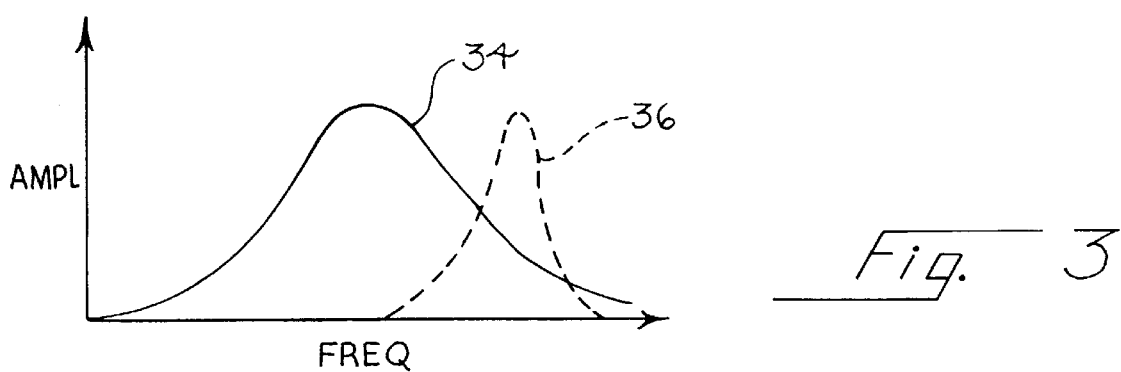
FIG. 3 is a graph showing the frequency spectrum of first and second transmit signals that are generated by the transmit beamformer of FIG. 1, and that differ in ultrasonic imaging bandwidth and center frequency.

The controller 26 also controls the transmit beamformer 12 to apply narrow-bandwidth transmit pulses to the transducer array 18, and these narrow-bandwidth transmit pulses are used to acquire a second ultrasonic image frame. As shown in FIG. 3, the narrow ultrasonic bandwidth transmit pulse may have a frequency spectrum 36. The narrow bandwidth pulse has a bandwidth substantially narrower than the broad-bandwidth pulse used for the detail frame. The ultrasonic imaging bandwidth and center frequency of the narrow transmit pulse are chosen to excite the thinner region 30 of the transducer array 18, without exciting the thicker region 32 of the transducer array 18. Thus, when the narrow bandwidth transmit pulse is used to excite the transducer array 18, only the thinner region 30 of the transducer array 18 is active. This results in a very high resolution along the elevational or Y axis at ranges spaced from the elevation focus, because the insonified slice of tissue in the imaged region has a narrow thickness in the elevational or Y direction, and elevation resolution is further improved on receive. Axial resolution of the image data collected with the narrow bandwidth transmit pulse is relatively low, in view of the narrow bandwidth of the transmit pulse. The second image signal acquired with the narrow bandwidth transmit pulse 36 is thus characterized by a high elevational contrast and a low axial contrast as compared to the detail frame described above. As decreases in slice thickness increase contrast resolution, the second image frame will be referred to on occasion as the contrast frame in the following discussion.

Figure 1:
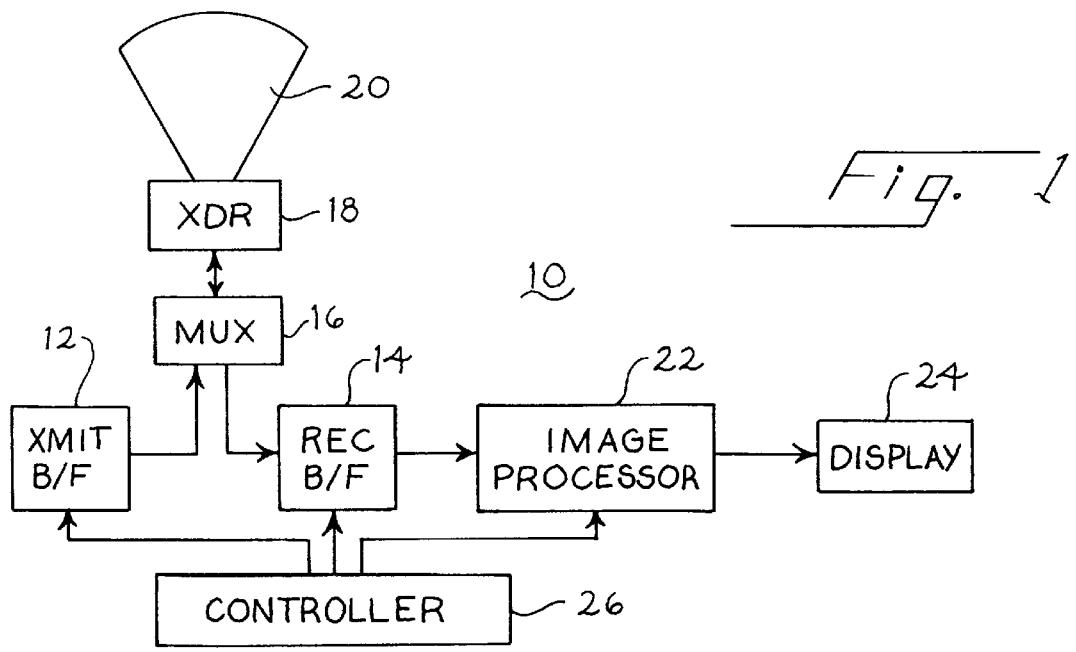
FIG. 1 is a block diagram of an ultrasonic imaging system that incorporates a presently preferred embodiment of this invention.
Figure 4:
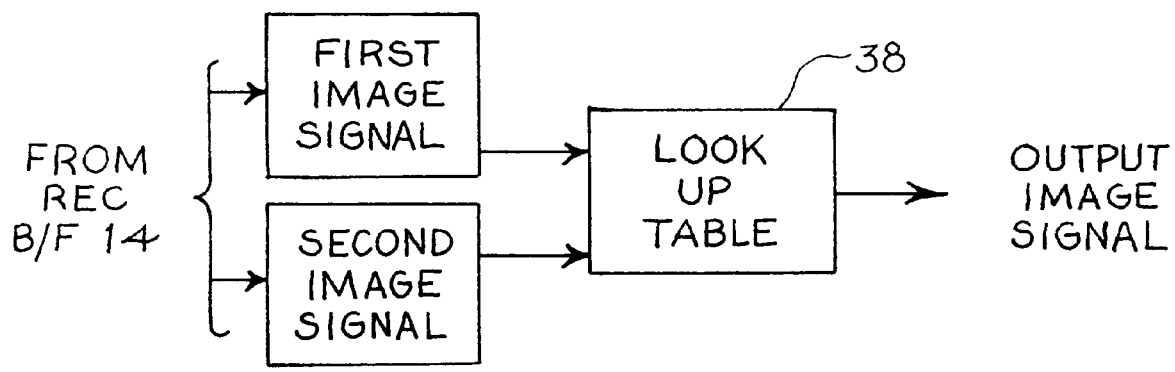
FIG. 4 is a schematic view of selected components of the image processor of FIG. 1.

As shown in FIG. 4, the image processor of FIG. 1 includes a lookup table 38 that includes at least two dimensions. The lookup table 38 uses as addresses the first and second image signals associated with the detail and contrast frames, respectively. At any given time, the address signals applied to the lookup table 38 are associated with the same or nearly the same physical point in the imaged region 20. The lookup table 38 combines the first and second image signals for display using a two-dimensional map. Preferably, the first and second image signals are substantially matched in gain such that the two image signals are at substantially the same level for any given intermediate tissue gray level.

Figure 5:
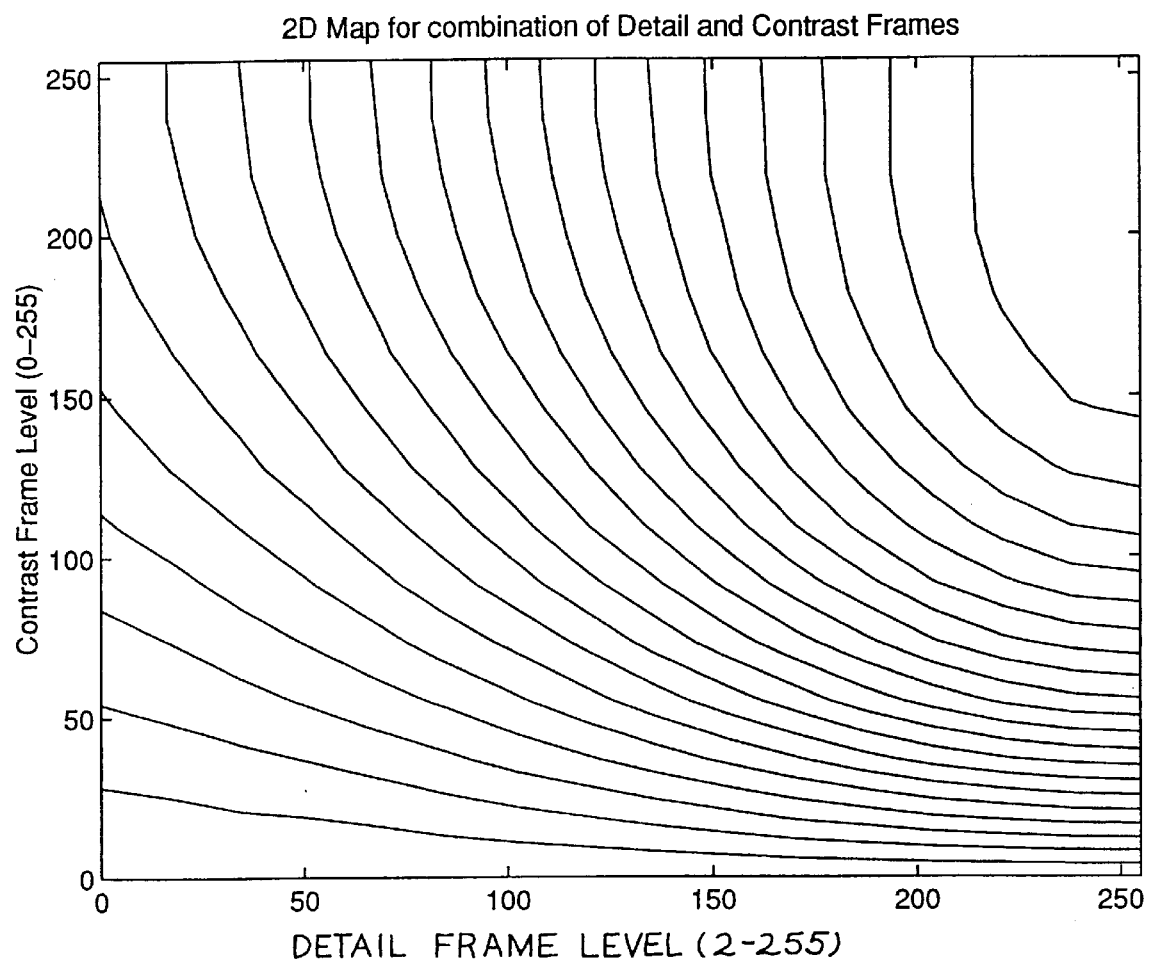
FIG. 5 is a contour diagram showing the response characteristics of the lookup table of FIG. 4.

FIG. 5 shows a graph of a suitable response curve for the lookup table 38. This response curve is designed to maintain the contrast resolution of the contrast frame and the detail resolution of the detail frame. The spatial resolution of the contrast frame is generally worse than that of the detail frame, owing to the decreased axial resolution described above. In view of the reduced slice thicknesses described above, the contrast frame has greater contrast resolution at ranges spaced from the focus. At low gray scale levels, the map of FIG. 5 of this embodiment is nearly multiplicative, because the improved contrast afforded by the reduced slice thickness of the contrast frame is likely to be due to hypoechoic objects that are resolved in elevation in the contrast frame but not in the detail frame. Such objects appear dark in the contrast frame but are lost in the detail frame due to relatively bright tissue nearby in elevation. In order to maintain such dark objects on the display 24, low gray scale levels in the contrast frame are associated with low output levels for display, as is the case for a multiplicative map. The map of FIG. 5 is essentially multiplicative at low gray scale levels and saturation suppressed at high gray scale levels. The output image signal supplied by the lookup table 38 is used to create the displayed frames on the display 24. These displayed frames contain contrast that is afforded by the high elevational resolution contrast frame while retaining axial resolution of the high axial resolution detail frame.

The contrast and detail frames may be acquired with widely varying imaging parameters. For example, the imaging parameters for the contrast and detail frames may differ in terms of axial response design (modulation frequency, pulse bandwidth, filtering), azimuthal focal distance for transmit, space-time design (beam type, apodization type, f-number, line density), gain management (transmit power, front and back end gain), and video filtering.

The contrast and detail frames may be acquired sequentially, one after the other, or they may be acquired in interleaved fashion by interleaving on a line-by-line basis, or a group-of-lines by group-of-lines basis. The contrast and detail frames may also be focus interleaved images (in sequential focus mode) and beam interleaved images (in multiple parallel receive beam mode).

Furthermore, it is not essential in all embodiments that the detail and contrast frames be acquired using transmit signals that differ in ultrasonic imaging bandwidths. Instead, the contrast frame may be acquired simply by post-beam-formation filtration (pre- or post-detection) of the detail frame. For example, the beamformed signals generated by the receive beamformer 14 may be filtered to vary the ultrasonic imaging bandwidth such that the detail frame is provided with an ultrasonic imaging bandwidth that is relatively large (thereby producing a high axial resolution and a low elevational resolution) while the contrast frame is provided with an ultrasonic imaging bandwidth that is relatively small (thereby producing a higher elevational resolution at ranges spaced from the focus and a lower axial resolution). In this case, the thinner region 30 of the transducer array 18 is active on receive only during the contrast frames, while both the thinner regions 30 and the thicker regions 32 are active on receive during the detail frames.

As used herein, a portion of a transducer is said to be active when that portion of the transducer participates either in producing an ultrasonic pulse on transmit, in receiving an ultrasonic echo signal on receive, or both. As used herein the term "ultrasonic imaging bandwidth" refers to the bandwidth of the ultrasonic signals that are used in the formation of the beamformed image signal. As explained above, the ultrasonic imaging bandwidth can be controlled by controlling the ultrasonic bandwidth of the transmit signals, the ultrasonic bandwidth applied by way of filtering to the receive signals, or both.

Simply by way of example, the following information is provided in order better to define the best mode of this invention as presently contemplated by the inventors. For this example, the ultrasonic imaging system 10 is of the type distributed by Acuson Corporation the Sequoia 512 system, and the transducer array is a symmetric transducer of the type distributed by Acuson Corporation as Model No. 15L8. This transducer has an aspect ratio of 2:1, an elevation aperture width of 4 mm, and a geometrical focal depth of 15 mm. The 2:1 to aspect ratio refers to the ratio of the thickness of the PZT transducer material at the edges and the center of the elevation aperture, respectively.

Table 1 provides by way of example imaging parameters that can be used for the detail and contrast image frames in this exemplary system.

TABLE 1

| Imaging Parameter | First or Detail Image Frame | Second or Contrast Image Frame |
| --- | --- | --- |
| Center Frequency | | |
| Transmit | 14 MHz | 16 MHz |
| Receive Bandwidth | 13 MHz | 15.5 MHz |
| Transmit | 55% | 13% |
| Receive Apodization | 35% | 12% |
| (Transmit and Receive) F# | Half Circle Uniform | Half Circle Uniform |
| Transmit | 2.6 | 2.6 |
| Receive | 1.4 | 1.4 |
| Transmit Focal Distance | 1 cm | 1 cm |
| Receive Focal Distance | 0-Display Depth | 0-Display Depth |
| Video Filtering | none | none |

As explained above, the detail and contrast frames are generally acquired using entirely different sets of imaging parameters. Here, the imaging pulse center frequency and bandwidth are the primary concern. This embodiment is optimized for near field imaging. For this reason, the detail frame is acquired using imaging parameters that afford the maximum axial spatial resolution without concern about limited penetration. The imaging pulse is therefore the highest frequency full-bandwidth pulse that is supported by the response spectrum of the transducer array. For the transducer array described above, the full elevational aperture is excited by such a pulse. By way of example, the transmit pulses of Table 1 for the detail frame have a center frequency of 14 MHz and a bandwidth of 55% (measured at points −6.8 dB with respect to the frequency of maximum amplitude). The contrast frame is acquired using an imaging pulse with a higher center frequency and a narrower bandwidth in order to improve elevational resolution as described above. As shown in Table 1, the center frequency of the transmit pulses for the contrast frame is 16.0 MHz with a bandwidth of 13% (measured between the points −6.8 dB with respect to the frequency of maximum amplitude). For a transducer array of the type described having a −6.8 dB upper band edge of about 15.6 MHz and a 2:1 aspect ratio, this transmit pulse produces an elevation slice thickness of about 1.3 mm measured at points −6.8 dB with respect to maximum amplitude. Though not intending to be limiting, it is believed that this pulse is preferred for acquisition of the contrast frame. Still higher frequencies and/or more narrow ultrasonic image bandwidths can be used and may yield a slightly smaller elevation slice thickness, at the expense of signal strength since such a transmit pulse would be situated well above the upper band edge of the transducer array.

Figure 6:
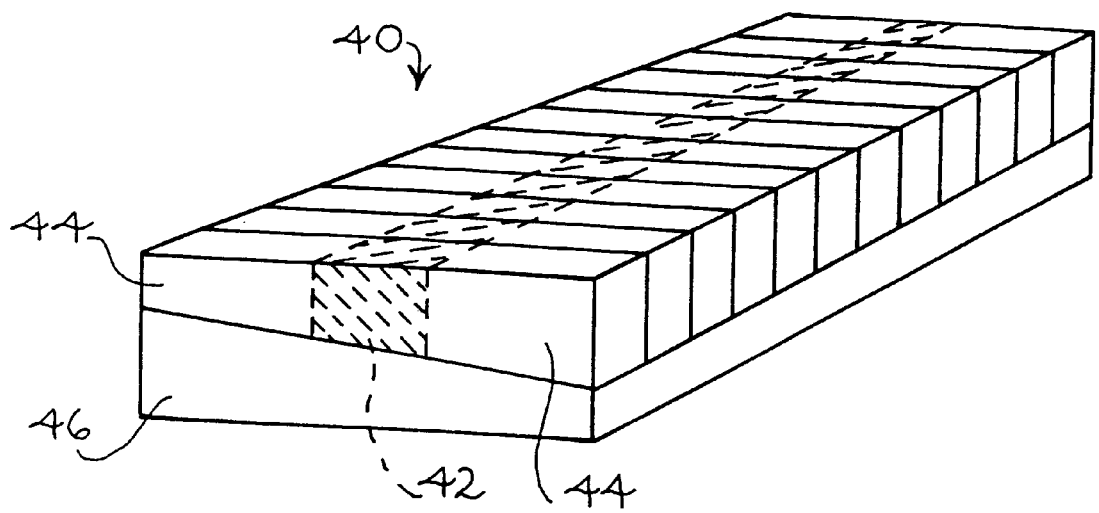
FIG. 6 is a schematic perspective view of another transducer array suitable for use in the system of FIG. 1.

FIG. 6 shows an example of a transducer array 40 characterized by an asymmetric thickness function T(y). As shown in FIG. 6, the transducer array 40 includes a first region 42 positioned near the center of the transducer array 40 and a second region 44 positioned on both sides of the first region 42. As shown in FIG. 6, the transducer array 40 includes a backing block 46 that is shaped to partially or fully absorb the thickness variations in elevation. Because the backing block 46 can be shaped independently of the active PZT portion of the transducer 40, the transducer 40 as a whole can have any arbitrary thickness profile and arbitrary surface shape. For this reason, the transducer arrays used with this invention can be built to provide no elevation focusing, elevation focusing, or even elevation defocusing.

This invention can be adapted for use with a wide variety of imaging modes for the imaging system 10. B-mode imaging modes and Doppler imaging modes, including Doppler tissue imaging, color Doppler imaging, and the like are supported. The invention can be used with two-, three- or four-dimensional imaging, and if desired the map used in the lookup table 38 may be made depth dependent.

As used herein, the term "image" is intended broadly to encompass both an entire frame and part of a frame of an ultrasonic image. The term "image signal" is intended broadly to encompass all forms of the beamformed signal provided by the receive beamformer 14 in various stages of processing by the image processor 22.

From the foregoing detailed description, it should be apparent that the imaging system 10 is used to acquire first and second images of the imaged region using the transducer array 18, 40. The first and second images differ in ultrasonic imaging bandwidth. This causes a first portion of the transducer array to be active in both of the images while another portion of the transducer array is active in only one of the images. The first and second images are then combined for display.

More generally, the imaging system 10 acquires first and second ultrasonic images of an imaged region, wherein the first and second images differ at least in ultrasonic imaging bandwidth (of course, the images may also differ in transmit center frequency or a wide range of other imaging parameters). The imaging system 10 then combines the first and second images for display. Because of the differing ultrasonic imaging bandwidth between the first and second images, the first image is characterized by a higher axial resolution and a lower elevational resolution than the second image at ranges spaced from the focus. Thus, the transmit and receive beamformers 12, 14, the multiplexer 16, and the transducer array 18 cooperate to form a means for acquiring the first and second ultrasonic images as described above. The processor 22 forms a means for combining these first and second images for display.

Many other alternatives are possible. For example, the detail and contrast images can be combined in a multiplicative fashion without using lookup tables. Other systems for combining the two images can be substituted, as appropriate for the particular application. Any suitable transmit and receive beamformers can be used, including both digital and analog receive beamformers. As pointed out above, the transducer array 18 can take many forms, including both symmetric and asymmetric forms. Linear or curved arrays can be used. The lookup table 38 may be implemented with a one-dimensional memory and suitable addressing logic.

The foregoing detailed description as described only a few of the many forms that this invention can take. For this reason, the detailed description is not intended as a definition of the invention. It is only the following claims, including all equivalents, that are intended to define the invention.

We claim:

1. A method for forming an ultrasonic image comprising the following steps:
    (a) providing an ultrasonic transducer array comprising an azimuthal direction and an elevational direction, wherein the transducer array is characterized by an elevation aperture size that varies as a function of at least one of ultrasonic imaging bandwidth and ultrasonic center frequency, said transducer array comprising a first region and at least one second region which extend along the azimuthal direction;
    (b) using the transducer array to acquire first and second images of an imaged region, said first and second images differing in at least one of ultrasonic imaging bandwidth and ultrasonic center frequency such that one of the transducer regions is active in both of said images while another of said transducer regions is active in only one of said images; and
    (c) combining portions of the first and second images associated with substantially the same part of the imaged region for display.

2. The method of claim 1 wherein step (b) comprises the step of acquiring the first and second images as interleaved images selected from the group consisting of line interleaved images, focus interleaved images and beam interleaved images.

3. The method of claim 1 wherein step (b) comprises the step of acquiring the first and second images as sequential images.

4. The method of claim 1 wherein step (b) comprises the step of applying transmit signals to the transducer array, wherein the transmit signals differ in ultrasonic imaging bandwidth for the first and second images.

5. The method of claim 1 wherein step (b) comprises the step of filtering image signals responsive to the transducer array, wherein the filtering step varies in ultrasonic imaging bandwidth for the first and second images.

6. The method of claim 1 wherein the first and second images are characterized by respective axial resolutions and elevational resolutions, wherein said one of the images has a higher axial resolution than said other of said images at selected ranges, and wherein said another of the images has a higher elevational resolution than said one of the images at said selected ranges.

7. The method of claim 1 wherein step (c) comprises the step of combining the first and second images with a map comprising at least two dimensions.

8. The method of claim 1 wherein the transducer array provided in step (a) is piano-concave in shape.

9. The method of claim 1 wherein the transducer array provided in step (a) is asymmetric in shape.

10. The method of claim 1 or 9 wherein step (b) comprises the step of applying transmit signals to the transducer array, wherein the transmit signals differ in ultrasonic center frequency for the first and second images.

11. The method of claim 1 or 9 wherein step (b) comprises the step of filtering image signals responsive to the transducer array, wherein the filtering step varies in ultrasonic center frequency for the first and second images.

12. The method of claim 1 wherein the first region comprises a thinner region and the second region comprises a thicker region.

13. A method for forming an ultrasonic image comprising the following steps:
    (a) acquiring first and second ultrasonic images of an imaged region with a transducer array, said first image characterized by a higher axial resolution and a lower elevational resolution than said second image at selected ranges; and (b) combining portions of the first and second images associated with substantially the same part of the imaged region for display.

14. A method for forming an ultrasonic image comprising the following steps:

(a) acquiring first and second ultrasonic images of an imaged region with a transducer array characterized by an elevation aperture size that varies as a function of ultrasonic imaging bandwidth and ultrasonic center frequency, said first and second images differing in at least one of ultrasonic imaging bandwidth and ultrasonic center frequency; and (b) combining portions of the first and second images associated with substantially the same part of the imaged region for display.

15. The method of claim 13 or 14 wherein step (a) comprises the step of acquiring the first and second images as interleaved images.

16. The method of claim 13 or 14 wherein step (a) comprises the step of acquiring the first and second images as sequential images.

17. The method of claim 13 or 14 wherein step (b) comprises the step of combining the first and second images with a map comprising at least two dimensions.

18. The method of claim 13 or 14 wherein step (a) comprises the step of applying transmit signals to the transducer array, wherein the transmit signals differ in ultrasonic imaging bandwidth for the first and second images.

19. The method of claim 13 or 14 wherein step (a) comprises the step of filtering image signals responsive to the transducer array, wherein the filtering step varies in ultrasonic imaging bandwidth for the first and second images.

20. The method of claim 18 wherein the transducer array is piano-concave.

21. The method of claim 19 wherein the transducer array is piano-concave.

22. The method of claim 13 or 14 wherein step (a) comprises the step of applying transmit signals to the transducer array, wherein the transmit signals differ in ultrasonic center frequency for the first and second images.

23. The method of claim 13 or 14 wherein step (a) comprises the step of filtering image signals responsive to the transducer array, wherein the filtering step varies in ultrasonic center frequency for the first and second images.

24. The method of claim 22 wherein the transducer array is asymmetric.

25. The method of claim 23 wherein the transducer array is asymmetric.

26. The method of claim 1 or 12 or 14 wherein the first image is characterized by a higher ultrasonic center frequency and a lower ultrasonic imaging bandwidth than the second image.

27. The method of claim 1 or 13 or 14 wherein the first image is characterized by center transmit and receive frequencies $F_{T1}$ and $F_{R1}$, respectively, wherein the second image is characterized by center transmit and receive frequencies $F_{T2}$ and $F_{R2}$, respectively, and wherein $F_{T1}/F_{R1}$ is substantially equal to $F_{T2}/F_{R2}$.

28. The method of claim 1 or 13 or 14 wherein the first and second images are both fundamental images.

29. The method of claim 1 or 13 or 14 wherein an entire elevation aperture of the transducer is active in one of the first and second images.

30. An ultrasonic imaging system comprising:

a transmit beamformer and a receive beamformer coupled to an ultrasonic transducer array, said transducer array comprising an azimuthal direction and an elevational direction, said transducer array characterized by an elevation aperture size that varies as a function of at least one of ultrasonic imaging bandwidth and ultrasonic center frequency, said transducer array comprising a first region and at least one second region which extend along the azimuthal direction;

an image processor, responsive to the receive beamformer, and operative to create images of an imaged region;

a controller coupled to at least one of the transmit beamformer, the receive beamformer and the image processor, said controller operative to cause the image processor to form first and second images of the imaged region, said first and second images differing in at least one of ultrasonic imaging bandwidth and ultrasonic center frequency such that one of the transducer regions is active in both of said images, while the other of the transducer regions is active in only one of said images;

said image processor comprising a lookup table responsive to both the first and second images to generate an output image signal.

31. The invention of claim 30 wherein the transducer array is plano-concave.

32. The invention of claim 30 wherein the transducer array is asymmetric.

33. The method of claim 30 wherein the first region comprises a thinner region and the second region comprises a thicker region.

34. The invention of claim 33 wherein the first image is characterized by a first ultrasonic imaging bandwidth selected to render the thinner region active and the thicker region inactive, and wherein the second image is characterized by a second ultrasonic imaging bandwidth selected to render the thinner region and the thicker region active.

35. The invention of claim 33 wherein the first image is characterized by a first ultrasonic center frequency selected to render the thinner region active and the thicker region inactive, and wherein the second image is characterized by a second ultrasonic center frequency selected to render the thinner region and the thicker region active.

36. An ultrasonic imaging system comprising:

means for acquiring first and second ultrasonic images of an imaged region with a transducer array, said first image characterized by a higher axial resolution and a lower elevational resolution than said second image at selected ranges; and means for combining portions of the first and second images associated with substantially the same part of the imaged region for display.

37. An ultrasonic imaging system comprising:

means for acquiring first and second ultrasonic images of an imaged region with a transducer array characterized by an elevation aperture size that varies as a function of ultrasonic imaging bandwidth and ultrasonic center frequency, said first and second images differing in at least one of ultrasonic imaging bandwidth and ultrasonic center frequency; and means for combining portions of the first and second images associated with substantially the same part of the imaged region for display.

38. The invention of claim 36 or 37 wherein the first and second images differ in ultrasonic imaging bandwidths.

39. The invention of claim 36 or 37 wherein the first and second images differ in ultrasonic center frequencies.

40. The invention of claim 36 or 37 wherein the acquiring means comprises a plano-concave ultrasonic transducer array.

41. The invention of claim 36 or 37 wherein the acquiring means comprises an asymmetric ultrasonic transducer array.

42. The invention of claim 30, 36 or 37 wherein the first image is characterized by a higher ultrasonic center frequency and a lower ultrasonic imaging bandwidth than the second image.

43. The invention of claim 30 or 36 or 37 wherein the first image is characterized by center transmit and receive frequencies $F_{T1}$, and $F_{R1}$, respectively, wherein the second image is characterized by center transmit and receive frequencies $F_{T2}$ and $F_{R2}$, respectively, and wherein $F_{T1}/F_{R1}$ is substantially equal to $F_{T2}/F_{R2}$.

44. The invention of claim 30 or 36 or 37 wherein the first and second images are both fundamental images.

45. The invention of claim 30 or 36 or 37 wherein an entire elevation aperture of the transducer is active in one of the first and second images.

* * * * *

UNITED STATES PATENT AND TRADEMARK OFFICE
CERTIFICATE OF CORRECTION

PATENT NO. : 5,902,242
DATED : May 11, 1999
INVENTOR(S) : Kutay F. Ustuner et al.

It is certified that error appears in the above-identified patent and that said Letters Patent is hereby corrected as shown below:

<u>In the Claims</u>

Claim 26, line 1, change "12" to --13--.

Signed and Sealed this

Eleventh Day of April, 2000

Attest:

Q. TODD DICKINSON

Attesting Officer

Director of Patents and Trademarks